(12) United States Patent
Senci et al.

(10) Patent No.: US 10,572,914 B2
(45) Date of Patent: Feb. 25, 2020

(54) SYSTEMS AND METHODS FOR IDENTIFYING UPDATED UNREQUESTED ON-FILE DATA

(71) Applicant: MasterCard International Incorporated, Purchase, NY (US)

(72) Inventors: David J. Senci, Troy, IL (US); Kyle Williams, O'Fallon, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 319 days.

(21) Appl. No.: 15/381,451

(22) Filed: Dec. 16, 2016

(65) Prior Publication Data

US 2018/0174211 A1    Jun. 21, 2018

(51) Int. Cl.
*G06Q 30/04*    (2012.01)

(52) U.S. Cl.
CPC .................................. *G06Q 30/04* (2013.01)

(58) Field of Classification Search
CPC ...... G06Q 30/04; G06Q 20/102; G06Q 20/12; G06Q 20/20; G06Q 20/401
USPC ................ 705/34, 39, 44, 21, 41, 26.8, 26.1
See application file for complete search history.

(56) References Cited

U.S. PATENT DOCUMENTS

| | | | |
|---|---|---|---|
| 7,806,323 | B2 | 10/2010 | Fomitchev |
| 8,036,963 | B2 | 10/2011 | Carroll et al. |
| 8,706,623 | B2 | 4/2014 | Da Silva et al. |
| 2008/0301050 | A1 * | 12/2008 | DiGioacchino ........ G06Q 20/04 705/44 |
| 2009/0171839 | A1 | 7/2009 | Rosano et al. |
| 2010/0174644 | A1 | 7/2010 | Rosano et al. |
| 2011/0246284 | A1 * | 10/2011 | Chaikin ............... G06Q 20/105 705/14.38 |
| 2012/0296824 | A1 | 11/2012 | Rosano |
| 2014/0032409 | A1 | 1/2014 | Rosano |
| 2014/0214654 | A1 * | 7/2014 | Greenbaum ........... G06Q 20/00 705/39 |
| 2014/0258099 | A1 | 9/2014 | Rosano |

(Continued)

OTHER PUBLICATIONS

PCT International Search Report and Written Opinion, Application No. PCT/US2017/058436, dated Jan. 3, 2018, 12 pps.

*Primary Examiner* — Vanel Frenel
(74) *Attorney, Agent, or Firm* — Armstrong Teasdale LLP

(57) ABSTRACT

An automatic billing updater (ABU) computing device is provided. The ABU computing device receives, from a candidate merchant, a batch update request including a plurality of account identifiers and retrieves a plurality of historical account identifiers from an historical authorization database. Each account identifier of the historical account identifiers is associated with a respective historical transaction of the candidate merchant. The ABU computing device further compares the account identifiers of the batch update request to the historical account identifiers, identifies at least one unrequested account identifier from the historical account identifiers based on the comparison, retrieves unrequested billing data associated with the unrequested account identifier from a billing database that stores updated billing data associated with a plurality of payment accounts, and transmits the unrequested billing data to the candidate merchant. The unrequested account identifier is not included in the account identifiers of the batch update request.

18 Claims, 7 Drawing Sheets

(56) References Cited

U.S. PATENT DOCUMENTS

| | | | |
|---|---|---|---|
| 2014/0310180 A1* | 10/2014 | Davis | G06Q 20/10 |
| | | | 705/44 |
| 2014/0337215 A1 | 11/2014 | Howe | |
| 2014/0365368 A1 | 12/2014 | Rosano et al. | |
| 2015/0058109 A1* | 2/2015 | Lange | G06Q 30/0224 |
| | | | 705/14.25 |
| 2015/0186871 A1* | 7/2015 | Laracey | G06Q 20/3278 |
| | | | 705/41 |

* cited by examiner

SYSTEMS AND METHODS FOR IDENTIFYING UPDATED UNREQUESTED ON-FILE DATA

BACKGROUND

The field of the present disclosure relates generally to providing updated on-file data (e.g., billing data) to merchants, and more particularly, to proactive identification of unrequested on-file data based on historical authorization messages.

The payment card industry includes payment transactions wherein a payment cardholder makes a purchase, but the physical payment card is not present. These transactions are known as "card-not-present" (CNP) transactions. In such transactions, information regarding the payment card, including an account number and, in many instances, an expiration date for the payment card is transmitted from a merchant, along with an indicator that the transaction is a CNP transaction. An "account-on-file" transaction is a type of transaction in which the merchant stores information regarding the cardholder's payment card in a database, then retrieves the stored payment card information and includes it in at least one authorization request. One specific type of account-on-file transactions is a "recurring payment transaction", which a merchant initiates on a recurring basis for a particular cardholder. In such recurring payment transactions, the merchant stores information regarding the cardholder's payment card in a database, then retrieves the stored payment card information and includes it in each recurring authorization request. In addition to recurring payment transactions, merchants may also maintain account-on-file information to facilitate payment card transactions by repeat customers. For example, an online merchant may allow a shopper to create an online account and store billing data corresponding to one or more methods of payment. When the shopper is ready to check out and complete a purchase, the shopper may simply select one of the stored payment methods as opposed to having to reenter their payment card information.

A downside of storing payment card information, however, is that information regarding a payment card is subject to change. For example a cardholder's payment card might expire, causing a new payment card to be issued with a new expiration date while the card number remains the same. In such instances, an authorization request for a transaction containing the outdated expiration date would be denied by the issuer of the payment card. As a result, the merchant who originally submitted the authorization request is prevented from successfully obtaining payment until the merchant acquires the updated expiration date for the payment card. Due to wide adoption of the account-on-file payment model by merchants and cardholders, it is understandably difficult for a cardholder to update each merchant with new payment card expiration dates. Likewise, it reduces the benefits of the account-on-file payment model to require a merchant to inquire with each cardholder for an updated payment card expiration date prior to submitting each payment authorization request.

BRIEF DESCRIPTION

In one aspect, an automatic billing updater (ABU) computing device including a processor and a memory in communication with the processor is provided. The processor is programmed to receive, on behalf of a candidate merchant, a batch update request including a plurality of account identifiers and retrieve a plurality of historical account identifiers from an historical authorization database. The batch update request requests updated billing data for each account associated with the plurality of account identifiers. Each account identifier of the plurality of historical account identifiers is associated with a respective historical transaction of the candidate merchant. The processor is further programmed to compare the plurality of account identifiers of the batch update request to the plurality of historical account identifiers, identify at least one unrequested account identifier not included in the plurality of account identifiers of the batch update request from the plurality of historical account identifiers based on the comparison, retrieve unrequested billing data associated with the unrequested account identifier from a billing database configured to store updated billing data associated with a plurality of payment accounts, and transmit the unrequested billing data for at least one account associated with unrequested account identifier to the candidate merchant.

In another aspect, a method for retrieving updated unrequested on-file data is provided. The method is at least partially performed by an ABU computing device. The method includes receiving, on behalf of a candidate merchant, a batch update request including a plurality of account identifiers and retrieving a plurality of historical account identifiers from an historical authorization database. The batch update request requests updated billing data for each account associated with the plurality of account identifiers. Each account identifier of the historical account identifiers is associated with a respective historical transaction of the candidate merchant. The method further includes comparing the account identifiers of the batch update request to the historical account identifiers, identifying at least one unrequested account identifier not included in the account identifiers of the batch update request from the historical account identifiers based on the comparison, retrieving unrequested billing data associated with the unrequested account identifier from a billing database configured to store updated billing data associated with a plurality of payment accounts, and transmitting the unrequested billing data for at least one account associated with the unrequested account identifier to the candidate merchant.

In yet another aspect, at least one non-transitory computer-readable storage media having computer-executable instructions embodied thereon is provided. When executed by at least one processor, the computer-executable instructions cause the processor to receive, on behalf of a candidate merchant, a batch update request including a plurality of account identifiers and retrieve a plurality of historical account identifiers from an historical authorization database. The batch update request requests updated billing data for each account associated with the account identifiers. Each account identifier of the historical account identifiers is associated with a respective historical transaction of the candidate merchant. The computer-executable instructions further cause the processor to compare the account identifiers of the batch update request to the historical account identifiers, identify at least one unrequested account identifier not included in the plurality of account identifiers of the batch update request from the historical account identifiers based on the comparison, retrieve unrequested billing data associated with the unrequested account identifier from a billing database configured to store updated billing data associated with a plurality of payment accounts, and transmit the unrequested billing data for at least one account associated with the unrequested account identifiers to the candidate merchant.

BRIEF DESCRIPTION OF THE DRAWINGS

FIG. 1 is a schematic diagram illustrating an example automatic biller updater (ABU) system for identifying unrequested billing data in accordance with one embodiment of the disclosure.

FIG. 2 is an example data flow diagram of the system shown in FIG. 1.

FIG. 3 is an example multi-party payment card processing system that may be used to provide authorization messages to the system shown in FIG. 1.

FIG. 4 is an expanded block diagram of an example embodiment of a remote device for use in the system shown in FIG. 1.

FIG. 5 illustrates an example configuration of a host system for use in the system shown in FIG. 1.

FIG. 6 is a flowchart of an example process for providing updated billing data to a merchant using the system shown in FIG. 1.

FIG. 7 is a diagram of components of one or more example computing devices that may be used in embodiments of the described systems and methods.

DETAILED DESCRIPTION

Figure 1:
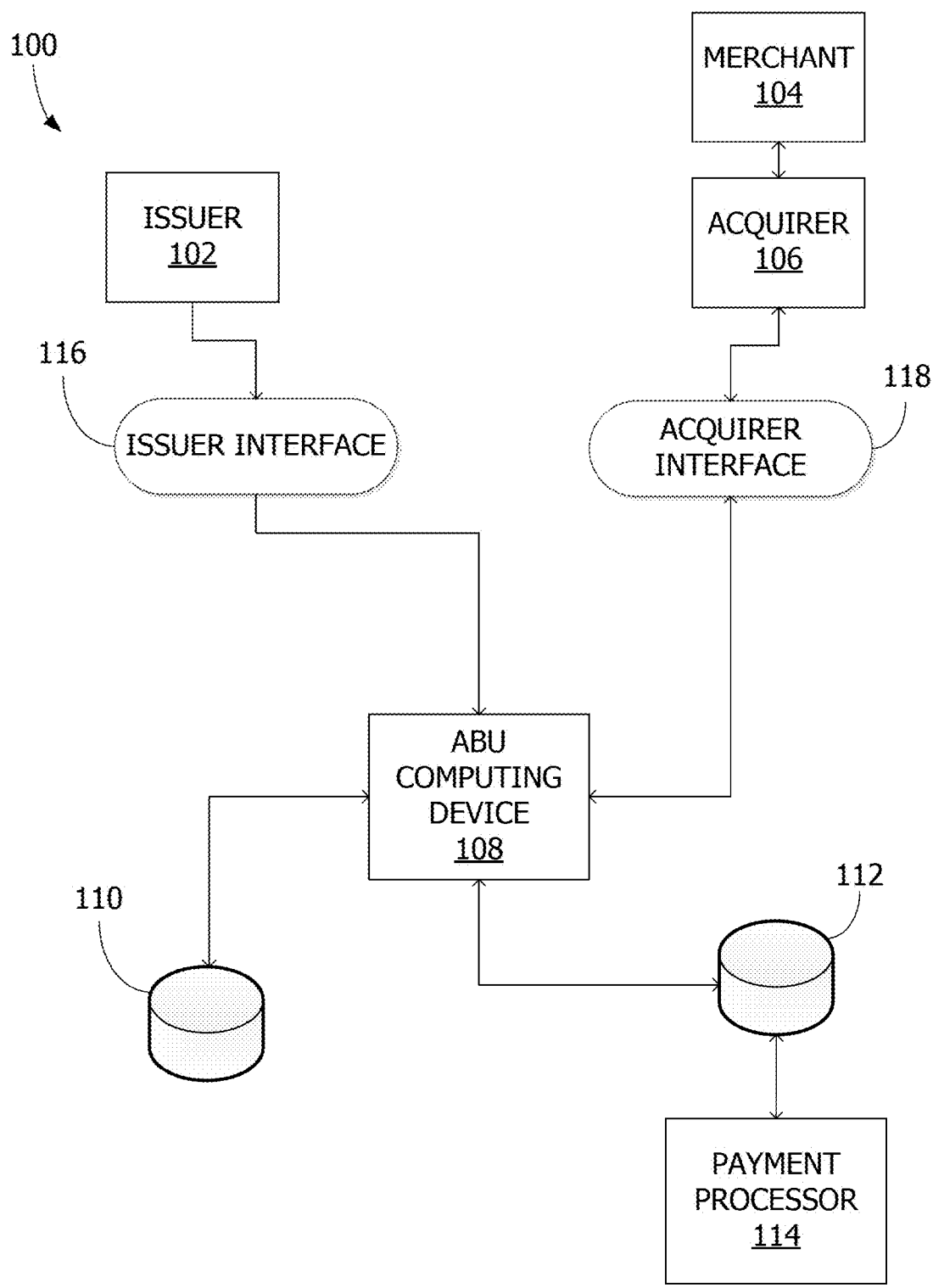
FIGS. 1-7 show example embodiments of the methods and systems described herein.

Systems and method according to this disclosure are directed to an automatic biller updater (ABU) system including an ABU computing device for maintaining on-file data stored by merchants, and for proactive identification of unrequested, updated on-file data for merchants for recurring payments.

The ABU computing device is in communication with a plurality of issuers, acquirers, and/or merchants and provides an ABU service. The issuers communicate with the ABU computing device using an issuer interface, while the acquirers and merchants communicate with the ABU computing device using an acquirer interface. These interfaces may be web interfaces, such as a web page or API calls. In other embodiments, the issuers, merchants, and acquirers may communicate with the ABU computing device using the same interface.

The ABU computing device periodically receives billing data from one or more issuers enrolled in the ABU service through the issuer interface and maintains the billing data in a billing database. The billing data includes an account identifier (e.g., a primary account number (PAN)), an expiry date, and/or other information associated with account-on-file transactions. The billing data received from the issuers may include updated billing data that replaces expired billing data for a payment account. In the example embodiment, the billing database stores historical billing data for a predetermined time period (e.g., two years) to facilitate identifying out-of-date billing data and providing updated billing data stored within the billing database.

Each merchant and/or acquirer maintains a merchant source table including information associated with one or more account-on-file payment accounts. That is, the merchant source table includes billing data from the account-on-file payment accounts. If the merchant is enrolled in the ABU service and wishes to verify billing data for upcoming account-on-file transactions, the merchant may, directly or indirectly through an acquirer, submit an update request to the ABU computing device. In the example embodiment, multiple update requests from one or more merchants are submitted simultaneously as a batch file (referred to herein as a "batch update request").

Each update request includes information from the merchant source table and may include one or more account identifiers. In one embodiment, the update request includes an acquirer identifier (ID), a merchant ID, a PAN, an expiry date, and discretionary data (e.g., a record identifier for the acquirer). In other embodiments, the update requests include additional, fewer, or alternative data elements, including those described elsewhere herein. In response to receiving an update request, the ABU computing device may look up or otherwise retrieve billing data in the billing database corresponding to the account identifier, and generate an update response containing the retrieved data. The retrieved billing data may include the PAN and expiry date stored by the billing database. In the example embodiment, the generated update response includes indicators for updated billing data such that the merchant can identify which payments accounts in the merchant source table correspond to updated billing data, thereby enabling the merchant to replace the old billing data with the updated billing data. For example, the update response may include the out-of-date billing date from the update request with a pointer or link to the updated billing data.

In some embodiments, the ABU computing device may only retrieve updated billing data (i.e., billing data the ABU computing device has not previously retrieved for the merchant). The ABU computing device identifies out-of-date billing data by comparing the data from the update request to the data stored within the billing database. If updated billing data exists, the ABU computing device retrieves the updated billing data from the database. In such embodiments, if the billing data associated with a particular update request has not changed since a previous update request, the ABU computing device may use indicators, flags, and the like within the update response to identify the billing data as up-to-date. In some embodiments, the billing data for each payment account in the billing database is associated with an update timestamp. The update timestamp indicates the time and date that the associated billing data was last updated and is stored with the billing data.

In the example embodiment, the billing database is configured to store billing data for the payment accounts in a single, universal table that is searchable using account identifiers, such as PANs. In other embodiments, the ABU computing device or the billing database is configured to store a merchant on-file table associated with each merchant registered for the ABU service. The merchant on-file table includes one or more update entries. Each update entry includes an update timestamp and an account identifier associated with an update request from the merchant. The update entry may be associated with a plurality of update requests received within a predetermined period of time, such as part of a batch update request. In some embodiments in which the on-file table is associated with a plurality of merchants, the update entry may further include a merchant identifier. The update entries indicate which payment accounts (stored by the merchant) the merchant has requested billing data updates for and when the last request for a particular payment account was made. Accordingly, for each update request received, the ABU computing device is configured to edit or add to the merchant on-file table. In certain embodiments, if an update entry has not been updated within a predetermined period of time, the update entry may be removed from the merchant on-file table. In at least some embodiments, the merchant on-file table stores or is linked to the updated billing data stored in the billing database such that the updated billing data may be retrieved through the merchant on-file table.

In the example embodiment, the ABU computing device is further in communication with an historical authorization database. The historical authorization database is configured to store authorization messages from a payment processing network. The payment network is a closed network (i.e., connection to the payment network requires permission for the administrator of the payment network) that facilitates generating, receiving, and/or transmitting messages associated with transactions for one or more merchants, issuers, and acquirers in communication with the payment network. In particular, the payment network is configured to facilitate generating, receiving, and/or transmitting messages associated with payment card transactions. These messages may be formatted according to specific protocols associated with the payment network to provide different information and functions. For example, authorization messages are transmitted through the payment network to request authorization of a transaction. The authorization messages may include data elements such as, but not limited to, a payment amount, an account identifier (e.g., PAN), a cardholder identifier, a merchant identifier, a timestamp, and a location identifier. In one example, the authorization messages include ISO® 8583 compliant messages and ISO® 20022 compliant messages. As used herein, "ISO®" refers to a series of standards approved by the International Organization for Standardization (ISO is a registered trademark of the International Organization for Standardization of Geneva, Switzerland). ISO® 8583 compliant messages are defined by the ISO® 8583 standard which governs financial transaction card originated messages and further defines acceptable message types, data elements, and code values associated with such financial transaction card originated messages. ISO® 8583 compliant messages include a plurality of specified locations for data elements. ISO® 20022 compliant messages are defined by the ISO® 20022 standard. For example, ISO® 20022 compliant messages may include acceptor to issuer card messages (ATICA).

The historical authorization database is configured to receive authorization messages and/or other transaction data associated with a plurality of transactions from a payment processor associated with the payment network. The transaction data may include data elements extracted from the messages of the payment network. The data elements associated with each transaction may include, but are not limited to, a payment amount, and account identifier, a merchant identifier, a cardholder identifier, a location identifier, a transaction identifier, a timestamp, and/or other transaction-related data. The payment processor is configured to receive messages within the payment network and transmit the messages to the intended recipient. When the payment processor receives the authorization messages (e.g., from a merchant), the payment processor extracts or copies data elements from the authorization messages and stores the extracted data elements within the historical authorization database while transmitting the messages to the intended recipient (e.g., an issuer associated with a payment account identified by the authorization message). The data elements are stored as historical transaction data within the historical authorization database.

In the example embodiment, the ABU computing device is configured to provide an unrequested billing data (UBD) service for facilitating retrieval of updated billing data not requested ("unrequested billing data") by merchants within the ABU service. Rather than sending batch update requests for the each and every on-file payment account stored in the merchant source table, the merchant may send a batch update request associated with only a portion of the merchant source table to ABU computing device to update the billing data through the ABU service. For the payment accounts not included in the batch update request, updated billing data may not be retrieved and stored by the merchant, which may lead to unnecessary declined transactions for the missed payment accounts. In the UBD service, the ABU computing device is configured to identify payment accounts not included in the batch update request using the historical authorization messages, determine if the billing data associated with the unrequested payment accounts has been updated, and transmit any updated billing data associated with the unrequested payment accounts to the merchant. The updated billing data is included in a message (e.g., the update response) that is formatted to indicate that the updated billing data is associated with the unrequested payment accounts. In at least some embodiments, the merchants and/or acquirers enroll in the UBD service. Alternatively, the merchants and/or acquirers may be automatically enrolled in the UBD service.

In the example embodiment, the ABU computing device receives a batch update request for the ABU service from a candidate merchant that includes a plurality of account identifiers (sometimes referred to herein as "requested account identifiers"). In parallel to the ABU computing device retrieving billing data associated with the plurality of account identifiers of the batch update request from the billing database, the ABU computing device is configured to retrieve a plurality of historical account identifiers associated with a plurality of historical authorization messages associated with the candidate merchant from the historical authorization database. In the example embodiment, the historical account identifiers are associated with transactions that occurred within a predetermined period of time. In one example, the historical account identifiers are associated with transactions that occurred within the past thirty days. In at least some embodiments, the ABU computing device also retrieves a transaction timestamp for each historical account identifier that indicates a time and date associated with the respective transaction. Additionally or alternatively, the ABU computing device may retrieve other data elements from the historical authorization messages, such as an expiry date.

The ABU computing device is configured to compare the historical account identifiers to the requested account identifiers of the batch update request. In some embodiments, the ABU computing device compares any updated billing data associated with the requested account identifiers to the historical account identifiers. The ABU computing device identifies any unrequested account identifiers based on the comparison. An unrequested account identifier is an historical account identifier that is not included in or otherwise associated with the account identifiers of the batch update request. In at least some embodiments, the ABU computing device performs at lookup within the billing database for billing data associated with each unrequested account identifier. As used herein, "unrequested billing data" refers to billing data associated with unrequested account identifiers. In certain embodiments, the ABU computing device performs a lookup within the merchant on-file table for the unrequested billing data.

The ABU computing device is configured to retrieve the unrequested billing data associated with the unrequested account identifiers from the billing database. In the example embodiment, the ABU computing device is configured to retrieve only updated unrequested billing data from the billing database. After the unrequested billing data associated with each unrequested account identifier is located, the ABU computing device determines whether or not the unrequested billing data has been updated since the transaction associated with the unrequested account identifier. The ABU computing device is configured to compare data retrieved from a corresponding historical authorization message (e.g., an expiry date and/or a transaction timestamp) associated with the unrequested account identifier to the unrequested billing data in the billing database. Based on the comparison, the ABU computing device may determine that the unrequested billing data stored in the billing database has been updated since the transaction. For example, if the expiry date from the authorization message does not match the stored expiry date of the unrequested billing data, the unrequested billing data may have been updated since the transaction. In another example, if the unrequested billing data includes an update timestamp, the ABU computing device compares the update timestamp and the transaction timestamp to determine if the unrequested billing data has been updated after the transaction. If the update timestamp is more recent than the transaction timestamp, the unrequested billing data has been updated and the ABU computing device retrieves the unrequested billing data.

The ABU computing device is configured to transmit the updated unrequested billing data to the candidate merchant. The updated unrequested billing data is formatted and/or includes metadata that indicates to the candidate merchant that the unrequested account identifiers were not included in the batch update request. The candidate merchant may update a respective merchant source table with the updated unrequested billing data, thereby preventing declined transactions associated with the unrequested account identifiers. In some embodiments, if the candidate merchant has a recurring batch update request scheduled, the merchant may modify the request to include the unrequested account identifiers.

In some embodiments, the ABU computing device is configured to add the updated unrequested billing data to the update response that includes the updated billing data associated with the account identifiers of the batch update request. In such embodiments, the unrequested billing data is stored in the update response with metadata that indicates the unrequested account identifiers were not in the batch update request. In one embodiment, the metadata is an unrequested flag for each unrequested account identifier. The unrequested flag is a data element that selectively identifies the billing data as missing from the batch update request. The billing data associated with the account identifiers of the batch update request may also include an unrequested flag. The candidate merchant analyzes the update response and the unrequested flags to identify the unrequested billing data associated with unrequested account identifiers.

In other embodiments, the ABU computing device is configured to generate an unrequested identifier message that includes the unrequested billing data. The unrequested identifier message is separate from the update response and is formatted to cause the candidate merchant to automatically detect that the unrequested billing data is associated with unrequested account identifiers. In one example, the update response and/or the unrequested identifier message include a reason code (i.e., a data element stored in the metadata for the message) that identifies the billing data within the messages as either requested billing data or unrequested billing data. In at least some embodiments, the ABU computing device is configured to transmit the update response and the unrequested identifier message separately to the candidate merchant. The methods and systems described herein may be implemented using computer programming or engineering techniques including computer software, firmware, hardware or any combination or subset thereof, wherein the technical effects may be achieved by performing one of the following steps: (i) receiving, from a candidate merchant or an associated acquirer, a batch update request including a plurality of account identifiers; (ii) retrieving a plurality of historical account identifiers and corresponding timestamps from an historical authorization database, each historical account identifier and corresponding timestamp associated with a respective historical transaction of the candidate merchant; (iii) comparing the account identifiers of the batch update request to the historical account identifiers; (iv) identifying one or more unrequested account identifiers from the historical account identifiers based on the comparison, wherein the unrequested account identifiers are not associated with the plurality of account identifiers of the batch update request; (v) performing a lookup in a billing database for unrequested billing data associated with the unrequested account identifiers; (vi) determining whether the unrequested billing data has been updated since the respective historical transaction for each unrequested account identifier based on the transaction timestamp associated with the unrequested account identifier; (vii) retrieving the unrequested billing data from the billing database when the unrequested billing data is determined to have been updated since the historical transaction; and (viii) transmitting the unrequested billing data to the candidate merchant.

The systems and methods described herein are configured to facilitate (a) reduced number of declined on-file transactions, thereby increasing the bandwidth, processing speed, and efficiency of computer resources within a payment network configured to process the on-file transactions; (b) proactive identification of unrequested account identifiers to enable merchants to update their scheduled batch update requests with the unrequested account identifiers; (c) improved customer experience with the merchants by providing additional automation to on-file billing data storage at the merchant; and (d) improved identification and searching for data associated with unrequested account identifiers by storing and transmitting the data in specific formats and/or with specific metadata.

Described herein are computer systems such as a payment processor and an ABU computing device. As described herein, all such computer systems include a processor and a memory.

Further, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

The systems and processes are not limited to the specific embodiments described herein. In addition, components of each system and each process can be practiced independent and separate from other components and processes described herein. Each component and process also can be used in combination with other assembly packages and processes.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a gift card, and/or any other device that may hold payment account information, such as mobile phones, smartphones, personal digital assistants (PDAs), key fobs, and/or computers. Each type of transaction card can be used as a method of payment for performing a transaction.

The following detailed description illustrates embodiments of the disclosure by way of example and not by way of limitation. It is contemplated that the disclosure has general application to provide cardholder information to account-on-file merchants.

FIG. 1 is a schematic diagram illustrating an example automatic billing updater (ABU) system 100 for identifying updated, missing on-file data and providing the missing on-file data to merchants. In the example embodiment, system 100 includes an issuer 102, a merchant 104, an acquirer 106, an ABU computing device 108, a billing database 110, and an historical authorization database 112 communicatively coupled to a payment processor 114 of a payment network (not shown in FIG. 1). In other embodiments, system 100 may include additional, fewer, or alternative subsystems, including those described elsewhere herein. For example, system 100 may include a plurality of issuers 102, merchants 104, and/or acquirers 106.

In the example embodiment, issuer 102 is a bank or other financial institution that provides payment accounts and payment cards to cardholders. Issuer 102 is configured to maintain an up-to-date record of the cardholders' payment accounts to facilitate processing transactions. In one example, among other information, issuer 102 is configured to store a PAN and an expiration or expiry date for each payment card of the cardholders associated with issuer 102. If the cardholder requests a new payment card (e.g., when the expiry date is approaching), issuer 102 updates its records with new payment card information when the payment card is sent to the cardholder. If the new payment card is replacing a previous payment card, the previous payment card may be deactivated to prevent potentially fraudulent transactions with the previous card.

Merchant 104 is an account-on-file merchant. That is, merchant 104 stores payment information for one or more cardholders to facilitate purchases without requiring the cardholder to re-enter payment information if the cardholder is a repeat customer. For example, if the cardholder has purchased a subscription-based service or product through merchant 104, merchant 104 may automatically bill the cardholder at the end of a recurring time period (e.g., one month). In another example, a cardholder may have an account registered with merchant 104. Merchant 104 may store payment information for the cardholder with the account to enable the cardholder to simply select the stored payment information to complete a purchase. In at least some embodiments, the account-on-file transactions with merchant 104 are card-not-present (CNP) transactions. In the example embodiment, for account-on-file payment accounts, merchant 104 stores records including at least a current PAN, expiry date, and user identifier associated with each payment account. The user identifier may be, for example, an identifier that identifies the cardholder or account associated with the stored record, such as a username.

Acquirer 106 is associated with merchant 104. In particular, acquirer 106 is a bank or other financial institution that maintains a payment account of merchant 104. Acquirer 106 is configured to perform at least some payment actions on-behalf-of merchant 104, such as communicate with issuer 102 to settle payments.

ABU computing device 108 is in communication with issuer 102, merchant 104, and acquirer 106. In the example embodiment, issuer 102 communicates with ABU computing device 108 through an issuer interface 116. Merchant 104 and acquirer 106 communicate with ABU computing device 108 through an acquirer interface 118. Although it is shown that merchant 104 communicates through acquirer 106, it is to be understood that merchant 104 may access interface 118 directly. Interfaces 116, 118 may be, but are not limited to, web interfaces, command line interfaces, messaging interfaces, and the like. In some embodiments, interfaces 116, 118 may be combined together to form a single interface for issuer 102, merchant 104, and acquirer 106.

Billing database 110 is communicatively coupled to ABU computing device 108 to receive, store, and transmit up-to-date billing data associated with a plurality of payment accounts. That is, billing database 110 is configured to periodically receive updated billing data from issuer 102, store the updated billing data, and provide the updated billing data to ABU computing device 108. The billing data for each payment account includes, but is not limited to, an account identifier (e.g., a PAN), an expiry data, and other discretionary data. As new billing data is received for a particular payment account, old or outdated billing data is replaced or stored in as historical billing data such that queries to database 110 that include outdated billing data can be linked to the corresponding updated billing data.

Historical authorization database 112 is configured to store historical authorization messages from a plurality of historical transactions. The authorization messages include data elements corresponding to a respective historical transaction, including, but not limited to, an historical account identifier (e.g., a PAN), a transaction timestamp, an account expiry date, a payment amount, a merchant identifier, and/or a cardholder identifier. In the example embodiment, each historical authorization message is associated with a transaction that has been successfully authorized. That is, none of the authorization messages are associated with failed or incomplete transactions. Although databases 110, 112 are shown as single databases, it is to be understood that databases 110, 112 may be a plurality of databases in communication with ABU computing device 108, respectively.

In the example embodiment, the authorization messages are generated and/or collected by payment processor 114. Payment processor 114 is configured to process transactions within a payment network. That is, payment processor 114 is configured to receive, process, and/or transmit transaction data, authorization messages (e.g., ISO® 8583 compliant messages and ISO® 20022 compliant messages), and other transaction-related messages within the payment network. The payment network is configured to facilitate processing transactions (e.g., payment card transactions) by providing particular message protocols to merchants, issuers, acquirers, and payment processor 114 to perform particular functions within the payment network. In the example embodiment, the payment network is a closed network. That is, the payment network is configured to prevent unpermitted access to the messages within the payment network.

At least a portion of the authorization messages processed by payment processor 114 may be stored in database 112. Additionally or alternatively, one or more different computing devices associated with the payment network are communicatively coupled to historical authorization database 112 to provide at least a portion of the authorization messages.

Figure 2:
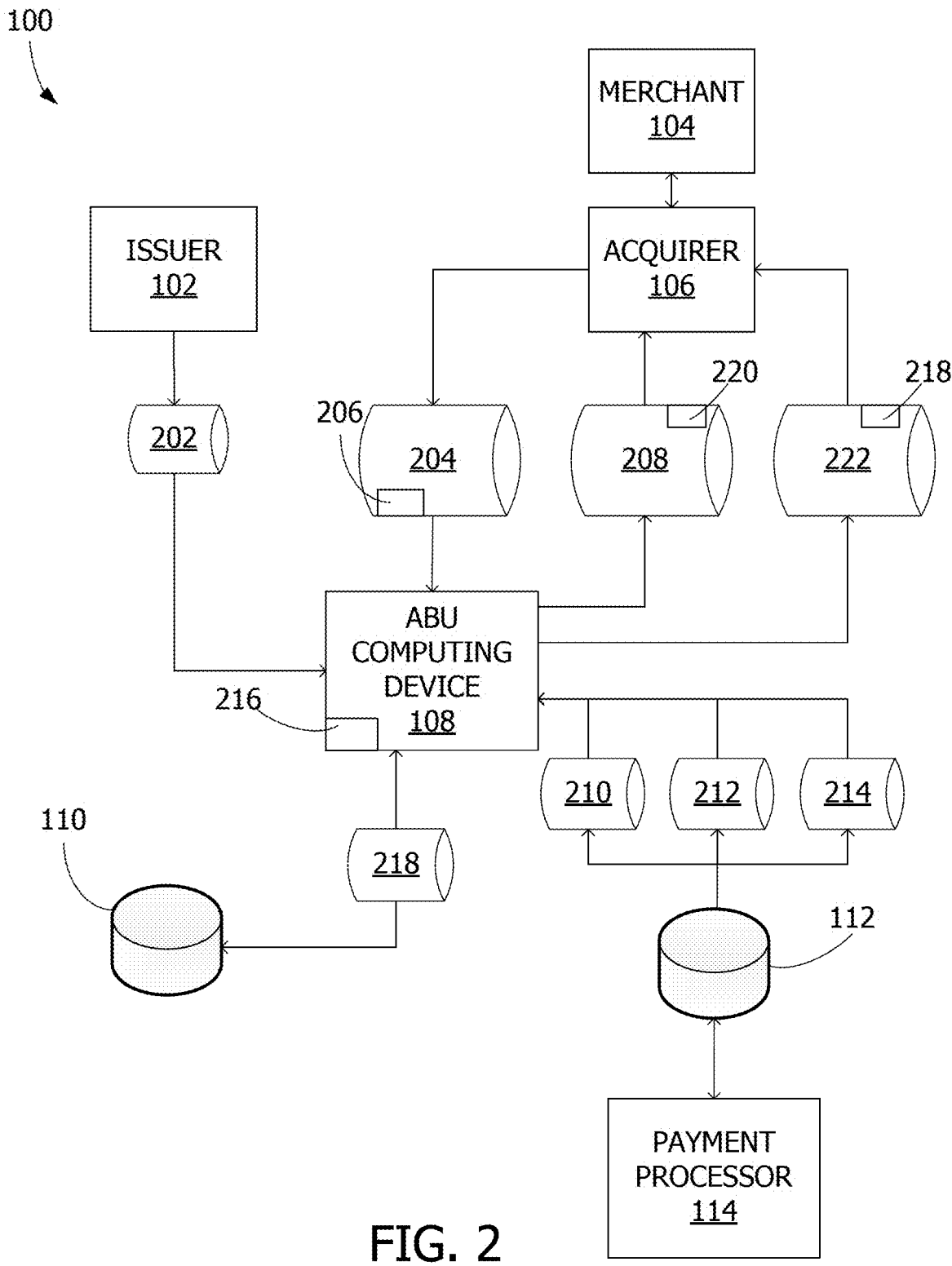

FIG. 2 is an example data flow diagram of system 100 (shown in FIG. 1). In particular, FIG. 2 depicts data flow between issuer 102, merchant 104, acquirer 106, ABU computing device 108, billing database 110, historical transaction database 112, and payment processor 114. In other embodiments, system 100 may provide additional, fewer, or alternative data, including those described elsewhere herein.

With reference to FIGS. 1 and 2, in the example embodiment, ABU computing device 108 periodically receives billing data 202 from issuer 102 through issuer interface 116. Billing data 202 is stored by ABU computing device 108 in billing database 110. Billing data 202 includes, but is not limited to, a PAN, an expiry date, and/or other information associated with account-on-file transactions. Billing data 202 may include updated billing data, such as updated billing data to replace billing data associated with an expired payment card, and/or new billing data for new account-on-file transactions. In one embodiment, billing data 202 is stored in one or more tables within billing database 110 that are configured to store billing data. If merchant 104 is enrolled in an ABU service provided by ABU computing device 108 and wants to verify billing data of one or more customers registered for account-on-file transactions, merchant 104 may, directly or indirectly through acquirer 106, submit a batch update request 204 to ABU computing device 108.

Batch update request 204 includes a plurality of requested account identifiers 206 (e.g., PANs). In some embodiments, each update request 204 also includes an expiry date to enable ABU computing device 108 to identify updated billing data 202 as described herein. In response to receiving update request 204, ABU computing device 108 looks up or otherwise retrieves billing data 202 in billing database 110 corresponding to account identifiers 206 and generates an update response 208 containing the retrieved billing data 202. The retrieved billing data 202 includes at least the PAN and expiry date stored in billing database 110 for each account identifier 206. In some embodiments, ABU computing device 108 may only retrieve updated billing data 202 (i.e., billing data that ABU computing device 108 has not previously retrieved for merchant 104). In such embodiments, if billing data 202 for a particular update request 204 has not changed, ABU computing device 108 indicates billing data 202 has not changed in update response 208. In one example, ABU computing device 108 compares the billing data from update request 204 (i.e., account identifier 206 and an expiry date) to billing data 202 of a corresponding record in billing database 110. If the billing data of update request 204 does not match, billing data 202 within billing database 110 is determined to be updated. Alternatively, ABU computing device 108 and/or billing database 110 may maintain a merchant on-file table (not shown) that indicates when each record of billing data 202 was updated by issuer 102 and the last time update request 204 was sent by merchant 104. If billing data 202 was updated after the last update request from merchant 104, ABU computing device 108 identifies billing data 202 as updated.

In certain embodiments, if billing data 202 has been updated, ABU computing device 108 maintains a record of historical billing data over a predetermined period of time (e.g., two years) for each payment account stored in billing database 110. By storing historical billing data, ABU computing device 108 is configured to identify up-to-date billing data 202 that corresponds to update requests 204 that include out-of-date information.

In the example embodiment, ABU computing device 108 is configured to provide an unrequested billing data (UBD) service for facilitating retrieval of updated billing data 202 not requested by merchant 104 in update request 204. That is, if merchant 104 does not include account identifiers 206 in update request 204 for each and every payment account stored by merchant 104, one or more of the unrequested payment accounts may have updated billing data 202 stored in billing database 110. If merchant 104 attempts to complete a transaction using the outdated billing data stored by merchant 104, the transaction will likely be declined.

ABU computing device 108 is configured to retrieve a plurality of historical account identifiers 210 associated with transactions of merchant 104 from historical transaction database 112. In particular, each historical account identifier 210 is associated with a respective transaction of merchant 104 and an authorization message stored by historical authorization database 112. Historical account identifiers 210 are associated with transactions that have occurred within a predetermined period of time (e.g., thirty days) to prevent an excess amount of outdated historical account identifiers from being retrieved. In at least some embodiments, ABU computing device 108 is further configured to retrieve a transaction timestamp 212, an account expiry date 214, and/or other data elements extracted from the authorization messages. Transaction timestamp 212 is a timestamp for the respective transaction and may indicate a time and date associated with initializing, processing, authorizing, or settling the transaction. Expiry date 214 is the expiry date of the payment account used to complete the respective transaction.

ABU computing device 108 is configured to compare historical account identifiers 210 to requested account identifiers 206 of batch update request 204. In some embodiments, ABU computing device 108 further compares any updated billing data 202 associated with requested account identifiers 206 to historical account identifiers 210. ABU computing device 108 identifies any unrequested account identifiers 216 based on the comparison. Unrequested account identifiers 216 are historical account identifier 210 that are not included in or otherwise associated with account identifiers 206. In at least some embodiments, ABU computing device 108 performs a lookup within billing database 110 for unrequested billing data 218 associated with each unrequested account identifier 216.

ABU computing device 108 is configured to retrieve unrequested billing data 218 from billing database 110. Unrequested billing data 218 is a subset of billing data 202 received from issuer 102. ABU computing device 108 is configured to perform a lookup within billing database 110 for unrequested billing data 218 using unrequested account identifier 216. In the example embodiment, ABU computing device 108 is configured to retrieve only updated unrequested billing data 218 from billing database 110. After unrequested billing data 218 is located, ABU computing device 108 determines whether or not unrequested billing data 218 has been updated since the transaction associated with unrequested account identifier 210. ABU computing device 108 is configured to compare unrequested account identifier 210, a respective transaction timestamp 212, and/or a respective account expiry date 214 of the transaction to the located unrequested billing data 218 in billing database 110. Based on the compared data, ABU computing device 108 may determine that billing data 218 stored in billing database 110 has been updated since the transaction. For example, if account expiry date 214 does not match the expiry date of billing data 218, billing data 218 may have been updated. In another example, if unrequested billing data 218 includes an update timestamp, ABU computing device 108 compares the update timestamp and transaction timestamp 212 to determine if unrequested billing data 218 has been updated after the transaction. If transaction timestamp 212 is older than the update timestamp, unrequested billing data 218 has been updated since the transaction.

ABU computing device 108 is configured to transmit the updated unrequested billing data 218 to merchant 104. The updated unrequested billing data 218 is formatted and/or includes metadata that indicates to merchant 104 that unrequested account identifiers 210 were not included in batch update request 204. Merchant 104 may update their source table of billing data with the updated unrequested billing data 218, thereby preventing declined transactions associated with unrequested account identifiers 210. In some embodiments, if merchant 104 has a recurring batch update request 204 scheduled, merchant 104 may modify batch update request 204 to include unrequested account identifiers 210.

In some embodiments, ABU computing device 108 is configured to add the updated unrequested billing data 218 to the update response 208 that includes billing data 202 associated with account identifiers 206 of batch update request 204. In such embodiments, unrequested billing data 218 is stored in update response 208 with metadata that indicates unrequested account identifiers 210 were not in batch update request 204. In one embodiment, the metadata is an unrequested flag 220 for each unrequested account identifier 210. Unrequested flag 220 is a data element that selectively identifies account identifiers 210 as not included in batch update request 204. Billing data 202 associated with requested account identifiers 206 may also include a respective unrequested flag 220. Merchant 104 analyzes update response 208 and unrequested flags 220 to identify unrequested billing data 218 from billing data 202 associated with requested account identifiers 206.

In other embodiments, ABU computing device 108 is configured to generate an unrequested identifier message 222 that includes unrequested billing data 218. Unrequested identifier message 222 is separate from update response 208 and is formatted to cause merchant 104 to automatically identify that unrequested identifier message 222 includes unrequested billing data 218. In one example, update response 208 and/or unrequested identifier message 222 include a reason code (i.e., a data element stored in the metadata for the message) that identifies the billing data within the messages as either requested billing data 202 or unrequested billing data 218. In at least some embodiments, ABU computing device 108 is configured to transmit update response 208 and unrequested identifier message 222 separately to merchant 104.

Figure 3:
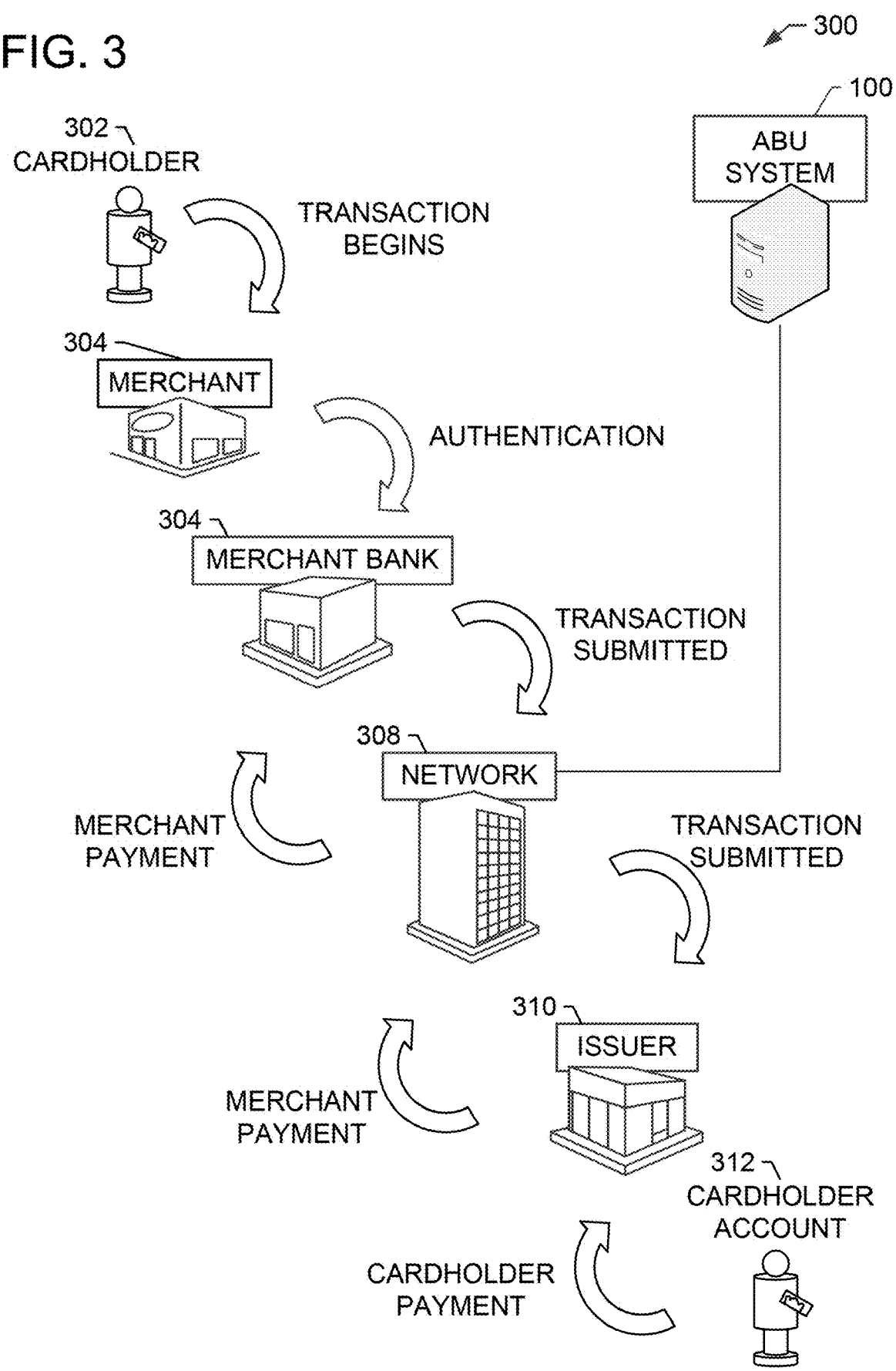

FIG. 3 is a schematic diagram illustrating an example multi-party payment card processing system 300 for processing payment card transactions (including account-on-file transactions). System 300 is communicatively coupled to ABU system 100 (shown in FIG. 1) to provide authorization messages, to system 100. The present disclosure relates to payment card system 300, such as a credit card payment system using the MasterCard® payment card system payment network 308 (also referred to as an "interchange" or "interchange network"). MasterCard® payment card system payment network 308 is a proprietary communications standard promulgated by MasterCard International Incorporated® for the exchange of financial transaction data between financial institutions that are members of MasterCard International Incorporated®. (MasterCard is a registered trademark of MasterCard International Incorporated located in Purchase, N.Y.).

In payment card system 300, a financial institution such as an issuer 310 issues a payment card for an account, such as a credit card account or a debit card account, to a cardholder 302, who uses the payment card to tender payment for a purchase from a merchant 304. To accept payment with the payment card, merchant 304 must normally establish an account with a financial institution that is part of the financial payment system. This financial institution is usually called the "merchant bank" or the "acquiring bank" or "acquirer bank" or simply "acquirer". When a cardholder 302 tenders payment for a purchase with a payment card (also known as a financial transaction card), merchant 304 requests authorization from acquirer 306 for the amount of the purchase. Such a request is referred to herein as an authorization request message. The request may be performed over the telephone, but is usually performed through the use of a point-of-interaction terminal, also referred to herein as a point-of-sale device, which reads the cardholder's account information from the magnetic stripe on the payment card and communicates electronically with the transaction processing computers of acquirer 306. Alternatively, acquirer 306 may authorize a third party to perform transaction processing on its behalf. In this case, the point-of-interaction terminal will be configured to communicate with the third party. Such a third party is usually called a "merchant processor" or an "acquiring processor."

For account-on-file transactions and other CNP transactions, cardholder 302 provides payment information or billing data associated with the payment card electronically to merchant 304. The payment information received by merchant 304 is stored and transmitted to acquirer 306 and/or payment network 308 as part of an authorization request message. In some embodiments, merchant 304 transmits a plurality of authorization request messages together as a "batch" file to acquirer 306 and/or payment network 308.

Using payment card system payment network 308, the computers of acquirer 306 or the merchant processor will communicate with the computers of issuer 310, to determine whether the cardholder's account 312 is in good standing and whether the purchase is covered by the cardholder's available credit line or account balance. Based on these determinations, the request for authorization will be declined or accepted. If the request is accepted, an authorization code is issued to merchant 304.

In the example embodiment, payment network 308 is configured to transmit the authorization request messages with the payment information to system 100 to facilitate identifying out-of-date billing data for account-on-file transactions. In the example embodiment, payment processor 114 (shown in FIG. 1) is part of payment network 308. In some embodiments, prior to authorization of the transactions, system 100 transmits an update message to payment network 308. The update message may include, for example, instructions to remove transactions associated with out-of-date billing data, instructions to transmit a message indicating any updated billing data to merchant 304, and/or instructions to replace out-of-date billing data with updated billing data. In at least some embodiments, payment network 308 may be configured to give merchant 304 to update or resubmit one or more authorization request messages that include updated billing data.

When a request for authorization is accepted, the available credit line or available balance of cardholder's account 312 is decreased. Normally, a charge is not posted immediately to a cardholder's account because bankcard associations, such as MasterCard International Incorporated®, have promulgated rules that do not allow a merchant to charge, or "capture," a transaction until goods are shipped or services are delivered. When a merchant ships or delivers the goods or services, merchant 24 captures the transaction by, for example, appropriate data entry procedures on the point-of-interaction terminal. If a cardholder cancels a transaction before it is captured, a "void" is generated. If a cardholder returns goods after the transaction has been captured, a "credit" is generated.

For debit card transactions, when a request for authorization is approved by the issuer, cardholder's account 312 is decreased. Normally, a charge is posted immediately to cardholder's account 312. The bankcard association then transmits the approval to the acquiring processor for distribution of goods/services, or information or cash in the case of an ATM.

After a transaction is captured, the transaction is settled between merchant 304, acquirer 306, and issuer 310. Settlement refers to the transfer of financial data or funds between the merchant's account, acquirer 306, and issuer 310 related to the transaction. Usually, transactions are captured and accumulated into a "batch," which is settled as a group.

Figure 4:
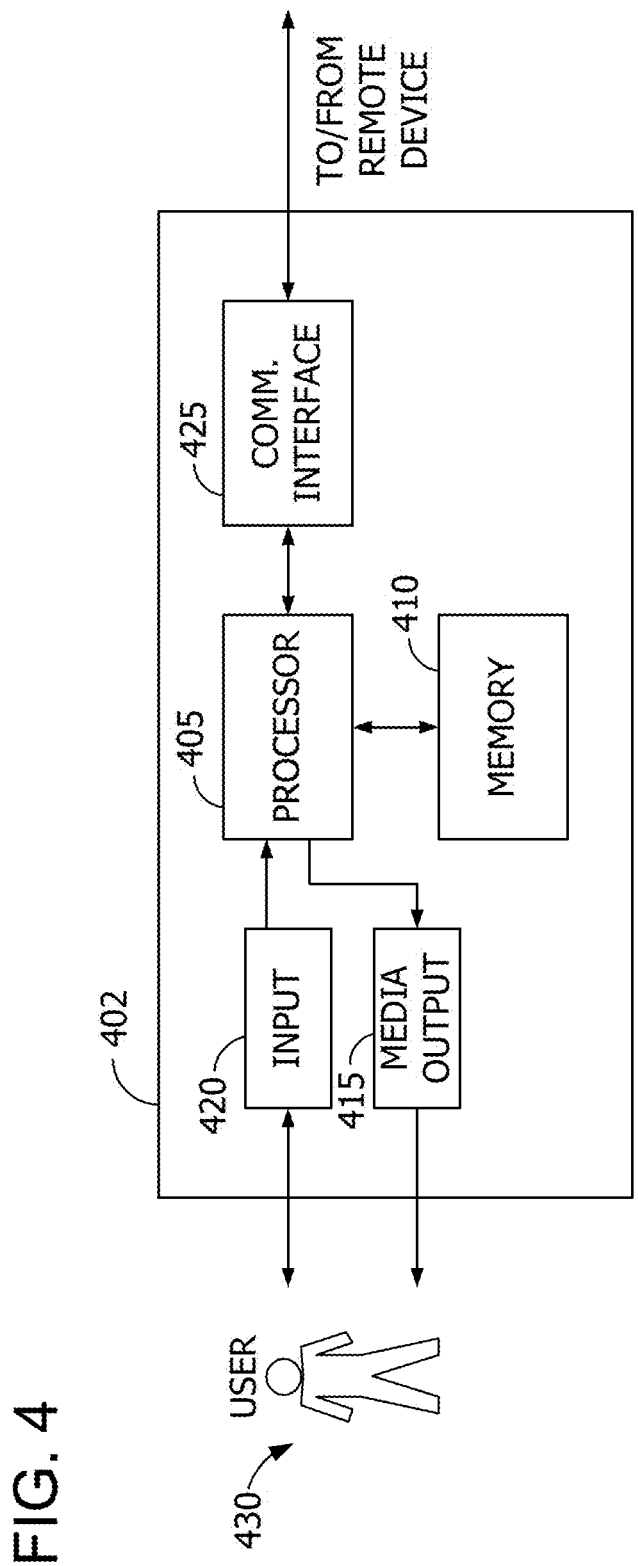

FIG. 4 depicts an exemplary configuration of a remote or user computing device 402, such as computing devices associated with issuer 102, merchant 104, and/or acquirer 106 (shown in FIG. 1). Computing device 402 may include a processor 405 for executing instructions. In some embodiments, executable instructions may be stored in a memory area 410. Processor 405 may include one or more processing units (e.g., in a multi-core configuration). Memory area 410 may be any device allowing information such as executable instructions and/or other data to be stored and retrieved. Memory area 410 may include one or more computer-readable media.

Computing device 402 may also include at least one media output component 415 for presenting information to a user 430. Media output component 415 may be any component capable of conveying information to user 430. In some embodiments, media output component 415 may include an output adapter, such as a video adapter and/or an audio adapter. An output adapter may be operatively coupled to processor 405 and operatively coupleable to an output device such as a display device (e.g., a liquid crystal display (LCD), organic light emitting diode (OLED) display, cathode ray tube (CRT), or "electronic ink" display) or an audio output device (e.g., a speaker or headphones). In some embodiments, media output component 415 may be configured to present an interactive user interface (e.g., a web browser or client application) to user 430.

In some embodiments, computing device 402 may include an input device 420 for receiving input from user 430. Input device 420 may include, for example, a keyboard, a pointing device, a mouse, a stylus, a touch sensitive panel (e.g., a touch pad or a touch screen), a camera, a gyroscope, an accelerometer, a position detector, and/or an audio input device. A single component such as a touch screen may function as both an output device of media output component 415 and input device 420.

Computing device 402 may also include a communication interface 425, which may be communicatively coupleable to a remote device. Communication interface 425 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 410 are, for example, computer-readable instructions for providing a user interface to user 430 via media output component 415 and, optionally, receiving and processing input from input device 420. A user interface may include, among other possibilities, a web browser and client application. Web browsers enable users 430 to display and interact with media and other information typically embedded on a web page or a website from a web server associated with a merchant. A client application allows users 430 to interact with a server application associated with, for example, a vendor or business.

Figure 5:
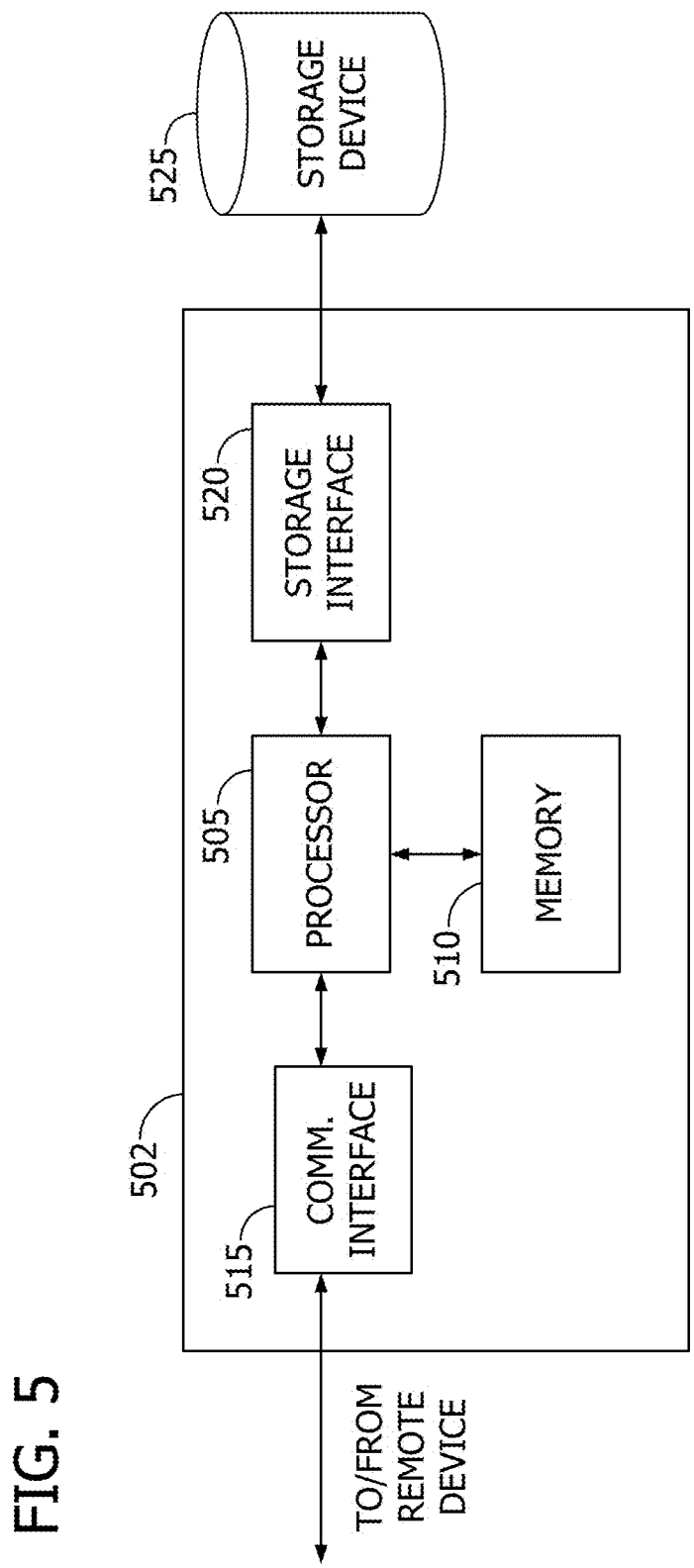

FIG. 5 depicts an exemplary configuration of a host computing device 502, such as ABU computing device 108 and payment processor 114 (shown in FIG. 1). Host computing device 502 may include a processor 505 for executing instructions. Instructions may be stored in a memory area 510, for example. Processor 505 may include one or more processing units (e.g., in a multi-core configuration).

Processor 505 may be operatively coupled to a communication interface 515 such that host computing device 502 may be capable of communicating with a remote device such as computing device 402 shown in FIG. 4 or another host computing device 502. For example, communication interface 515 may receive requests from user computing device 402 via the Internet.

Processor 505 may also be operatively coupled to a storage device 525. Storage device 525 may be any computer-operated hardware suitable for storing and/or retrieving data. In some embodiments, storage device 525 may be integrated in host computing device 502. For example, host computing device 502 may include one or more hard disk drives as storage device 525. In other embodiments, storage device 525 may be external to host computing device 502 and may be accessed by a plurality of host computing devices 502. For example, storage device 525 may include multiple storage units such as hard disks or solid state disks in a redundant array of inexpensive disks (RAID) configuration. Storage device 525 may include a storage area network (SAN) and/or a network attached storage (NAS) system.

In some embodiments, processor 505 may be operatively coupled to storage device 525 via a storage interface 520. Storage interface 520 may be any component capable of providing processor 505 with access to storage device 525. Storage interface 520 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 525.

Memory areas 410 (shown in FIG. 4) and 510 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

Figure 6:
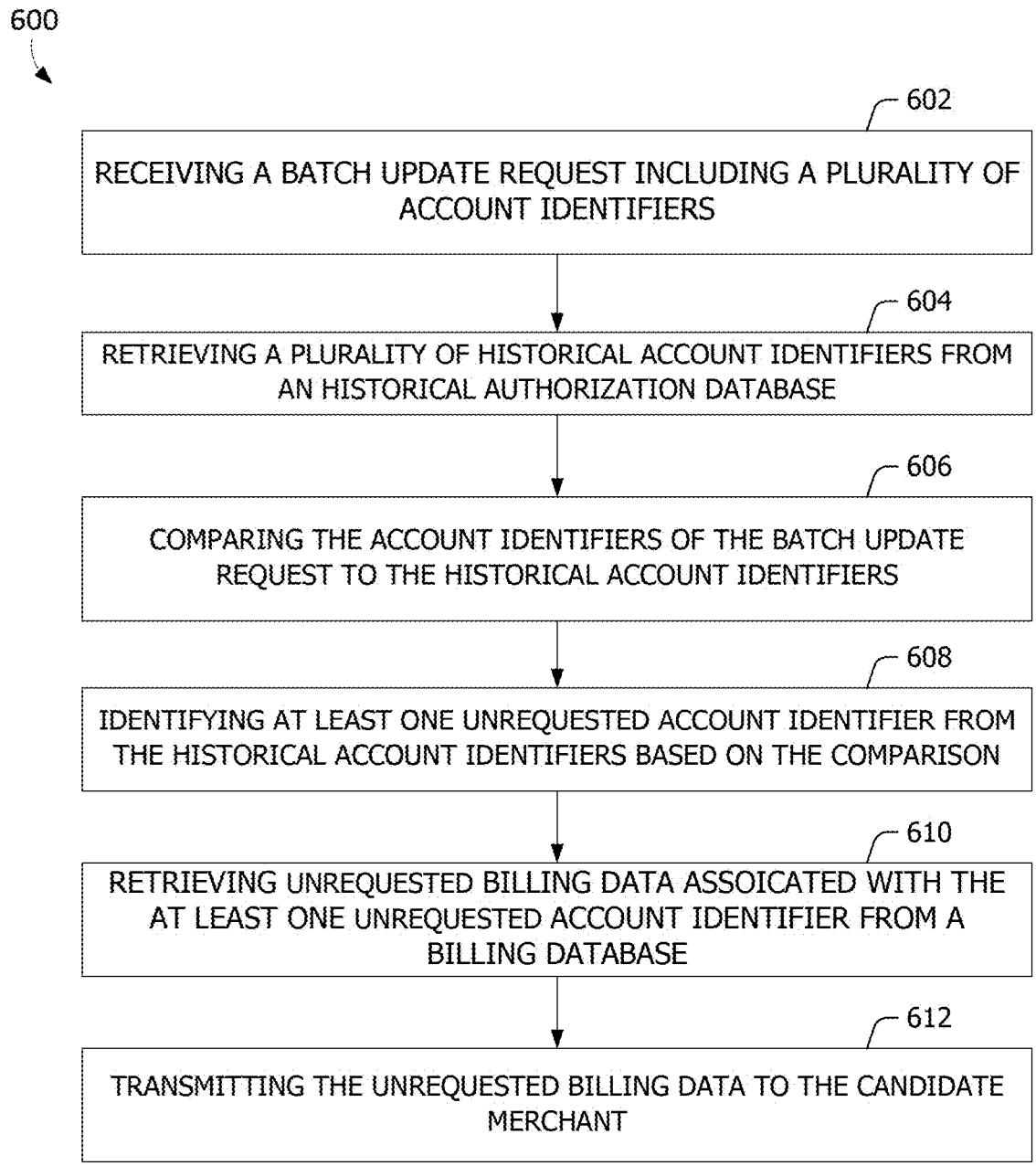

FIG. 6 is a flow diagram of an example method 600 for providing updated, unrequested billing data to a candidate merchant using an ABU system, such as system 100 (shown in FIG. 1). In the example embodiment, method 600 is performed by an ABU computing device. In certain embodiments, method 600 may be at least partially performed by a different computing device. In other embodiments, method 600 may include additional, fewer, or alternative actions, including those described elsewhere herein.

Method 600 begins with the ABU computing device receiving 602 a batch update request includes a plurality of account identifiers. The ABU computing device compares the account identifiers to a billing database storing billing data for a plurality of payment accounts and retrieves updated billing data associated with one or more of the account identifiers.

The ABU computing device also retrieves 604 a plurality of historical account identifiers from an historical authorization database. In at least some embodiments, the ABU computing device also retrieves a transaction timestamp and/or an account expiry date for each historical account identifier. The ABU computing device compares 606 the account identifiers of the batch update request to the historical account identifiers and identifies 608 one or more unrequested account identifiers based on the comparison. The unrequested account identifiers are a subset of the historical account identifiers and are not associated with the account identifiers of the batch update request.

The ABU computing device retrieves 610 unrequested billing data associated with the unrequested account identifier from the billing database. In at least some embodiments, the ABU computing device determines whether or not the unrequested billing data has been updated since the transaction associated with the unrequested account identifier. In such embodiments, the ABU computing device may only retrieve 610 updated unrequested billing data. In the example embodiment, the ABU computing device transmits 612 the unrequested billing data to the candidate merchant. In some embodiments, the ABU computing device generates an update response that includes both the unrequested billing data and the billing data associated with the account identifiers of the batch update request. The ABU computing device transmits the update response to the candidate merchant. In other embodiments, the ABU computing device generates an unrequested identifier message that includes the unrequested billing data and transmits the unrequested identifier message to the candidate merchant.

Figure 7:
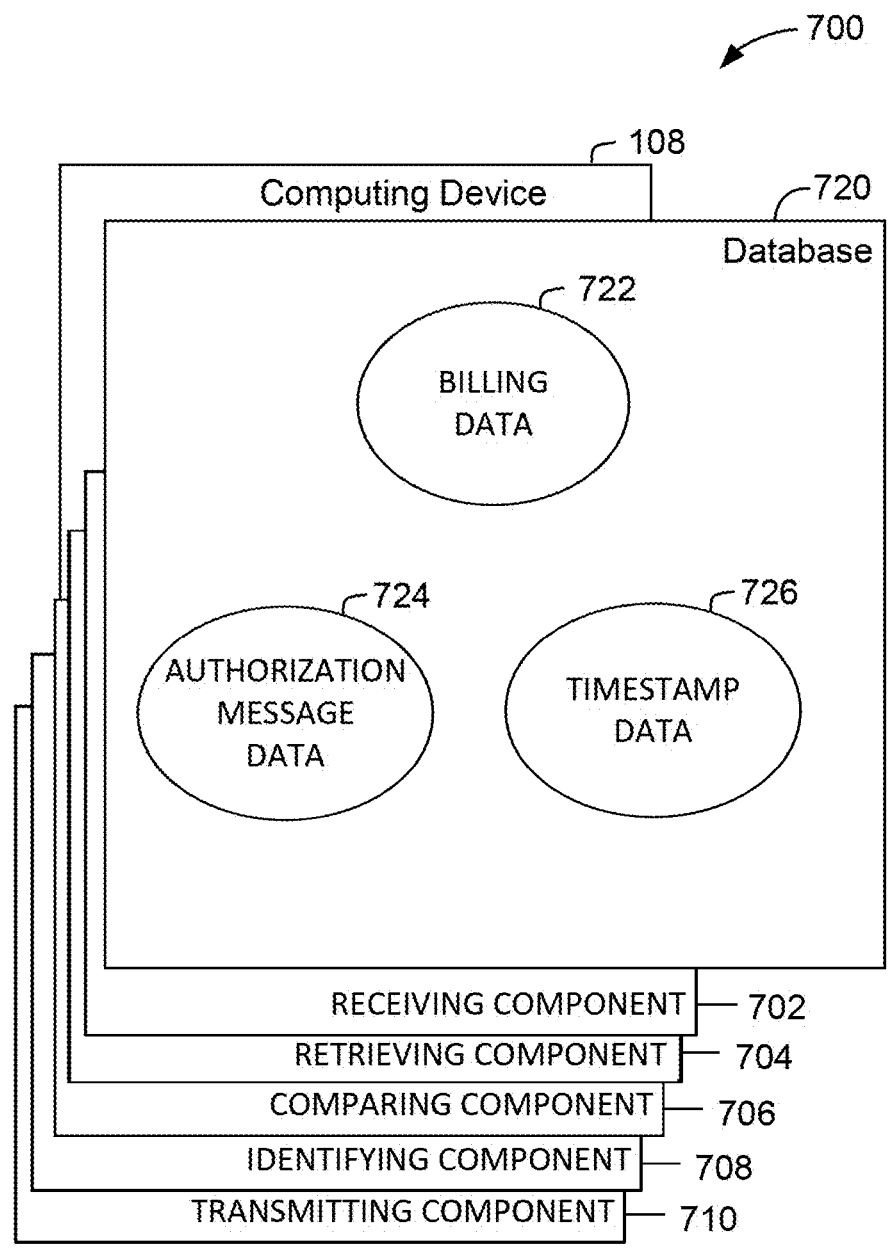

FIG. 7 is a diagram 700 of components of one or more example computing devices that may be used in the method shown in FIG. 6. FIG. 7 further shows a configuration of a database system 720 including at least billing database 110 and historical authorization database 112 (shown in FIG. 1). Database system 720 is coupled to several separate components within ABU computing device 108 (shown in FIG. 1), which perform specific tasks.

ABU computing device 108 includes a receiving component 702 configured to receive a batch update request from a candidate merchant. ABU computing device 108 further includes a retrieving component 704 configured to retrieve a plurality of historical account identifiers from an historical authorization database. Retrieving component 704 is further configured to retrieve billing data associated with the unrequested account identifier from a billing database configured to store updated billing data associated with a plurality of payment accounts. ABU computing device 108 also includes a comparing component 706 configured to compare the account identifiers of the batch update request to the historical account identifiers. ABU computing device 108 further includes an identifying component 708 configured to identify an unrequested account identifier from the historical account identifiers based on the comparison of the historical account identifiers with the account identifiers of the batch update request. ABU computing device 108 further includes a transmitting component 710 configured to transmit the billing data associated with the unrequested account identifier to the candidate merchant.

In an exemplary embodiment database system 720 is divided into a plurality of sections, including but not limited to, a billing data section 722, an authorization message data section 724, and a timestamp data section 726. These sections are separated between databases 110, 112 (e.g., billing data section 722 is stored in billing database 110). Databases 110, 112 are interconnected through ABU computing device 108 to update and retrieve the information as required.

As will be appreciated based on the foregoing specification, the above-discussed embodiments of the disclosure may be implemented using computer programming or engineering techniques including computer software, firmware, hardware or any combination or subset thereof. Any such resulting computer program, having computer-readable and/or computer-executable instructions, may be embodied or provided within one or more computer-readable media, thereby making a computer program product, i.e., an article of manufacture, according to the discussed embodiments of the disclosure. These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium," and "computer-readable media" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium," "computer-readable medium," and "computer-readable media," however, do not include transitory signals (i.e., they are "non-transitory"). The term "machine-readable signal" refers to any signal used to provide machine instructions and/or data to a programmable processor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An automatic billing updater (ABU) computing device comprising a processor and a memory in communication with the processor, the processor programmed to:
   receive, on behalf of a candidate merchant, a batch update request including a plurality of account identifiers, the batch update request requesting updated billing data for each account associated with the plurality of account identifiers;
   retrieve a plurality of historical account identifiers from a historical authorization database, each account identifier of the plurality of historical account identifiers associated with a respective historical transaction of the candidate merchant;
   compare the plurality of account identifiers of the batch update request to the plurality of historical account identifiers, wherein at least one of the historical account identifiers is not included in the plurality of account identifiers;
   identify, based on the comparison, the at least one of the historical account identifiers as at least one unrequested account identifier;
   retrieve unrequested billing data associated with the at least one unrequested account identifier from a billing database configured to store updated billing data associated with a plurality of payment accounts;
   generate an update response including both (i) updated billing data associated with the plurality of account identifiers of the batch update request, and (ii) the unrequested billing data associated with the at least one unrequested account identifier; and
   transmit the update response to the candidate merchant.

2. The ABU computing device in accordance with claim 1, wherein the processor is further programmed to:
   retrieve a transaction timestamp associated with the at least one unrequested account identifier from the historical authorization database, the transaction timestamp associated with the respective historical transaction of the at least one unrequested account identifier;
   determine whether the unrequested billing data for the at least one account associated with the at least one unrequested account identifier has been updated since the respective historical transaction based on the transaction timestamp; and
   retrieve the unrequested billing data for the at least one account associated with the at least one unrequested account identifier from the billing database when the unrequested billing data is determined to have been updated since the respective historical transaction, wherein the unrequested billing data is not retrieved when the unrequested billing data is determined to not have been updated since the respective historical transaction.

3. The ABU computing device in accordance with claim 2, wherein the billing database stores an update timestamp for each payment account of the plurality of payment accounts, the processor further programmed to:
   compare the transaction timestamp and the update timestamp associated with the at least one unrequested account identifier; and
   determine whether the unrequested billing data for the at least one account associated with the at least one unrequested account identifier has been updated since the respective historical transaction based on the comparison.

4. The ABU computing device in accordance with claim 1, wherein the processor is further programmed to:
   store, in the update response, an unrequested flag with the unrequested billing data, the unrequested flag indicating the at least one unrequested account identifier was not included in the batch update request.

5. The ABU computing device in accordance with claim 1, wherein the processor is further programmed to:
   retrieve an account expiry date associated with the at least one unrequested account identifier from the historical authorization database;
   perform a lookup within the billing database for the unrequested billing data for the at least one account associated with the at least one unrequested account identifier based on the at least one unrequested account identifier, wherein the unrequested billing data includes a stored account identifier and a stored expiry date;
   compare the unrequested billing data to the at least one unrequested account identifier and the account expiry date; and retrieve the unrequested billing data for the at least one account associated with the at least one unrequested account identifier when at least one of the stored account identifier does not match the at least one unrequested account identifier and the stored expiry date does not match the account expiry date.

6. The ABU computing device in accordance with claim 1, wherein the historical transactions associated with the plurality of historical account identifiers occurred within a predetermined period of time, and wherein the historical authorization database stores historical account identifier associated with transactions that occurred prior to the predetermined period of time.

7. A method for retrieving unrequested on-file data, the method comprising:
receiving, on behalf of a candidate merchant, a batch update request including a plurality of account identifiers, the batch update request requesting updated billing data for each account associated with the plurality of account identifiers;
retrieving, by an automatic biller updater (ABU) computing device, a plurality of historical account identifiers from a historical authorization database, each account identifier of the plurality of historical account identifiers associated with a respective historical transaction of the candidate merchant;
comparing, by the ABU computing device, the plurality of account identifiers of the batch update request to the plurality of historical account identifiers, wherein at least one of the historical account identifiers is not included in the plurality of account identifiers;
identifying, based on the comparison, the at least one of the historical account identifiers as at least one unrequested account identifier;
retrieving unrequested billing data associated with the at least one unrequested account identifier from a billing database configured to store updated billing data associated with a plurality of payment accounts;
generating an update response including both (i) updated billing data associated with the plurality of account identifiers of the batch update request, and (ii) the unrequested billing data associated with the at least one unrequested account identifier; and
transmitting, by the ABU computing device, the update response to the candidate merchant.

8. The method in accordance with claim 7, wherein retrieving the unrequested billing data further comprises:
retrieving a transaction timestamp associated with the at least one unrequested account identifier from the historical authorization database, the transaction timestamp associated with the respective historical transaction of the at least one unrequested account identifier;
determining, by the ABU computing device, whether the unrequested billing data for the at least one account associated with the at least one unrequested account identifier has been updated since the respective historical transaction based on the transaction timestamp; and
retrieving the unrequested billing data from the billing database when the unrequested billing data is determined to have been updated since the respective historical transaction, wherein the unrequested billing data is not retrieved when the unrequested billing data is determined to not have been updated since the respective historical transaction.

9. The method in accordance with claim 8, wherein the billing database stores an update timestamp for each payment account of the plurality of payment accounts, wherein retrieving the unrequested billing data further comprises:
comparing the transaction timestamp and the update timestamp associated with the at least one unrequested account identifier; and
determining, by the ABU computing device, whether the unrequested billing data for the at least one account associated with the at least one unrequested account identifier has been updated since the respective historical transaction based on the comparison.

10. The method in accordance with claim 7, wherein transmitting the unrequested billing data further comprises:
storing, in the update response, an unrequested flag with the unrequested billing data, the unrequested flag indicating the at least one unrequested account identifier was not included in the batch update request.

11. The method in accordance with claim 7, wherein retrieving the unrequested billing data further comprises:
retrieving an account expiry date associated with the at least one unrequested account identifier from the historical authorization database;
performing a lookup within the billing database for the unrequested billing data for the at least one account associated with the at least one unrequested account identifier based on the at least one unrequested account identifier, wherein the unrequested billing data includes a stored account identifier and a stored expiry date;
comparing, by the ABU computing device, the unrequested billing data to the at least one unrequested account identifier and the account expiry date; and
retrieving the unrequested billing data when at least one of the stored account identifier does not match the at least one unrequested account identifier and the stored expiry date does not match the account expiry date.

12. The method in accordance with claim 7, wherein the historical transactions associated with the plurality of historical account identifiers occurred within a predetermined period of time, and wherein the historical authorization database stores historical account identifier associated with transactions that occurred prior to the predetermined period of time.

13. At least one non-transitory computer-readable storage media having computer-executable instructions embodied thereon, wherein when executed by at least one processor, the computer-executable instructions cause the processor to:
receive, on behalf of a candidate merchant, a batch update request including a plurality of account identifiers, the batch update request requesting updated billing data for each account associated with the plurality of account identifiers;
retrieve a plurality of historical account identifiers from a historical authorization database, each account identifier of the plurality of historical account identifiers associated with a respective historical transaction of the candidate merchant;
compare the plurality of account identifiers of the batch update request to the plurality of historical account identifiers, wherein at least one of the historical account identifiers is not included in the plurality of account identifiers;
identify, based on the comparison, the at least one of the historical account identifiers as at least one unrequested account identifier;
retrieve unrequested billing data associated with the at least one unrequested account identifier from a billing database configured to store updated billing data associated with a plurality of payment accounts;

generate an update response including both (i) updated billing data associated with the plurality of account identifiers of the batch update request, and (ii) the unrequested billing data associated with the at least one unrequested account identifier; and transmit the update response to the candidate merchant.

14. The computer-readable storage media in accordance with claim 13, wherein the computer-executable instructions further cause the processor to:
retrieve a transaction timestamp associated with the at least one unrequested account identifier from the historical authorization database, the transaction timestamp associated with the respective historical transaction of the at least one unrequested account identifier;
determine whether the unrequested billing data for the at least one account associated with the at least one unrequested account identifiers has been updated since the respective historical transaction based on the transaction timestamp; and
retrieve the unrequested billing data for the at least one account associated with the at least one unrequested account identifiers from the billing database when the unrequested billing data is determined to have been updated since the respective historical transaction, wherein the unrequested billing data is not retrieved when the unrequested billing data is determined to not have been updated since the respective historical transaction.

15. The computer-readable storage media in accordance with claim 14, wherein the billing database stores an update timestamp for each payment account of the plurality of payment accounts, wherein the computer-executable instructions further cause the processor to:
compare the transaction timestamp and the update timestamp associated with the at least one unrequested account identifier; and
determine whether the unrequested billing data for the at least one account associated with the at least one unrequested account identifier has been updated since the respective historical transaction based on the comparison.

16. The computer-readable storage media in accordance with claim 13, wherein the computer-executable instructions further cause the processor to:
store, in the update response, an unrequested flag with the unrequested billing data, the unrequested flag indicating the at least one unrequested account identifier was not included in the batch update request.

17. The computer-readable storage media in accordance with claim 13, wherein the computer-executable instructions further cause the processor to:
retrieve an account expiry date associated with the at least one unrequested account identifier from the historical authorization database;
perform a lookup within the billing database for the unrequested billing data for the at least one account associated with the at least one unrequested account identifiers based on the at least one unrequested account identifier, wherein the unrequested billing data includes a stored account identifier and a stored expiry date;
compare the unrequested billing data to the at least one unrequested account identifier and the account expiry date; and
retrieve the unrequested billing data when at least one of the stored account identifier does not match the at least one unrequested account identifier and the stored expiry date does not match the account expiry date.

18. The computer-readable storage media in accordance with claim 13, wherein the historical transactions associated with the plurality of historical account identifiers occurred within a predetermined period of time, and wherein the historical authorization database stores historical account identifier associated with transactions that occurred prior to the predetermined period of time.

* * * * *